(12) United States Patent
Patera (10) Patent No.: US 8,185,261 B2
(45) Date of Patent: May 22, 2012

(54) SYSTEMS AND METHODS FOR ATTITUDE PROPAGATION FOR A SLEWING ANGULAR RATE VECTOR

(75) Inventor: Russell P. Patera, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 538 days.

(21) Appl. No.: 12/498,750

(22) Filed: Jul. 7, 2009

(65) Prior Publication Data

US 2011/0010027 A1    Jan. 13, 2011

(51) Int. Cl.
G05D 1/00 (2006.01)
G05D 1/08 (2006.01)
G05D 1/06 (2006.01)

(52) U.S. Cl. ............. 701/4; 701/3; 701/5; 701/6; 701/13
(58) Field of Classification Search .................... None
See application file for complete search history.

(56) References Cited

U.S. PATENT DOCUMENTS

| | | | |
|---|---|---|---|
| 5,452,869 A | 9/1995 | Basuthakur et al. | |
| 5,828,980 A | 10/1998 | Tazartes et al. | |
| 6,020,956 A | 2/2000 | Herman et al. | |
| 6,047,226 A | 4/2000 | Wu et al. | |
| 6,102,338 A | 8/2000 | Yoshikawa et al. | |
| 6,108,594 A | 8/2000 | Didinsky et al. | |
| 6,145,790 A | 11/2000 | Didinsky et al. | |
| 6,219,616 B1 | 4/2001 | Litmanovich et al. | |
| 6,263,264 B1 | 7/2001 | Herman et al. | |
| 6,341,249 B1 * | 1/2002 | Xing et al. | 701/13 |
| 6,424,915 B1 * | 7/2002 | Fukuda et al. | 701/470 |
| 6,523,786 B2 | 2/2003 | Yoshikawa et al. | |
| 6,615,117 B2 | 9/2003 | Li et al. | |
| 6,860,451 B1 * | 3/2005 | Wang | 244/164 |
| 7,124,001 B2 | 10/2006 | Li et al. | |
| 7,357,356 B1 * | 4/2008 | Goodzeit et al. | 244/164 |
| 7,487,016 B2 * | 2/2009 | Fowell et al. | 701/13 |
| 7,668,629 B2 * | 2/2010 | DiEsposti et al. | 701/13 |
| 2011/0172854 A1 * | 7/2011 | Barker | 701/4 |

OTHER PUBLICATIONS

Savage, Paul G., Strapdown Inertial Navigation Integration Algorithm Design Part 1: Attitude Algorithms, Journal of Guidance, Control, and Dynamics, vol. 21, No. 1, Jan.-Feb. 1998, pp. 19-28.

* cited by examiner

Primary Examiner — Khoi Tran
Assistant Examiner — Bao Long T Nguyen
(74) Attorney, Agent, or Firm — K&L Gates LLP (57) ABSTRACT

Computer-based systems and methods for determining attitude of a moveable object. Attitude is determined by a transformation matrix $\vec{U}$ from a body coordinate frame of the moveable object to an inertial reference frame. The transformation matrix is determined by: (i) determining a slew rate vector, $\vec{\alpha}$, for time $t_N$ for the moveable object that represents a change in direction of an angular rate vector, $\vec{\omega}$, for the moveable object over the time interval from $t_{N-1}$ to $t_N$ in the body coordinate frame; (ii) determining an update to the transformation matrix for time $t_N$ that is based on a product of two matrices, the first matrix being related to a sum of $\vec{\omega}$ and $\vec{\alpha}$, and the second matrix being related to $-\vec{\alpha}$; and (iii) multiplying a transformation matrix for time $t_{N-1}$ and the update to the transformation matrix for time $t_N$ to obtain the transformation matrix for time $t_N$.

20 Claims, 7 Drawing Sheets

SYSTEMS AND METHODS FOR ATTITUDE PROPAGATION FOR A SLEWING ANGULAR RATE VECTOR

BACKGROUND

The attitude of a space vehicle is defined by the relationship between its body reference frame and an inertial reference frame. There are several parameter sets that can be used to define the relationship between the two coordinate frames. The most popular are the Euler rotation vector, the direction cosine transformation matrix (DCM), Euler angles, and quaternions. The rate of attitude change is defined by the angular rate vector. Each attitude parameter set can be propagated when the angular rate is known. Thus, there is an associated differential equation driven by the angular rate vector for each parameter set.

Attitude propagation is accurate and easy, if the angular rate vector points in a fixed direction in space. In this special case, the angular rate vector can be integrated to obtain the Euler rotation vector. The other attitude parameters can be easily obtained from the Euler rotation vector. However, most attitude propagation cases of interest involve angular rate vectors that change direction as a function of time. In these cases, the angular rate vector cannot be integrated to yield the Euler rotation vector. One could assume that the angular rate vector remains constant over a short time interval and define a series of incremental angles. The incremental rotation angles could then be used to update the attitude. The smaller the time increment, the smaller the error over a fixed time duration. However, there will always be an error that grows with time. This error is often referred to as "coning error" because it appears most clearly when the angular rate vector executes a coning motion.

Propagating the attitude using the Euler rotation vector is popular because it contains only three parameters and does not have to be renormalized periodically as do quaternions or DCMs. In addition, the differential equation for the Euler rotation vector has a coning term. It is known in the prior art to evaluate numerically the coning term to reduce or eliminate coning error, which is important for vehicles having strapdown Inertial Navigation Units (INUs). These vehicles require that the attitude propagation algorithms be fast and accurate, to provide the correct attitude in real time or faster. Once the Euler rotation vector is propagated, it can be used to create the associated DCM or quaternion as needed.

As examples of prior art techniques for propagating attitude, the attitude of a vehicle can be specified by a transformation matrix $\vec{U}$ from the vehicle's coordinate frame to an inertial reference coordinate. If $\vec{X}_B$ is a vector in the vehicle body, it transforms to the inertial frame by the transformation, $$\vec{X}_I = \vec{U} \vec{X}_B \quad (1)$$

where $\vec{U}$ is the direction cosine transformation matrix and $\vec{X}_I$ is the vector in the inertial frame. The direction cosine transformation matrix $\vec{U}$ can be expressed as:

$$\vec{U} = \begin{pmatrix} 1+(e_3^2+e_2^2)C & -(e_1e_2C+e_3S) & e_2S-e_1e_3C \\ e_3S-e_1e_2C & 1+(e_1^2+e_3^2)C & -(e_3e_2C+e_1S) \\ -(e_3e_1C+e_2S) & e_1S-e_2e_3C & 1+(e_1^2+e_2^2)C \end{pmatrix} \quad (2)$$

where $\vec{e}$ is the unit vector in the direction of an axis of rotation known as the Euler axis, $\theta$ is the angle of rotation about the Euler axis, $C=\cos(\theta)-1$, and $S=\sin(\theta)$.

Figure 1:
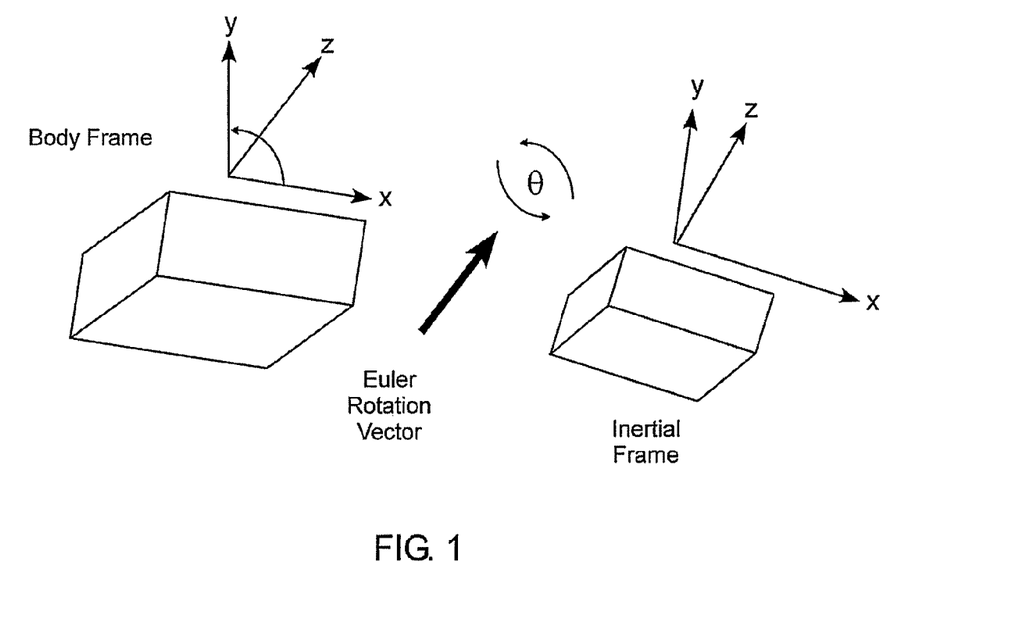
FIG. 1 is a diagram illustrating an Euler rotation vector with body and inertial coordinate frames.

Euler's' rotation theorem, which is graphically illustrated in FIG. 1, states that any transformation between two coordinate frames can be represented by a single rotation of angle $\theta$ about the Euler rotation axis. Thus, an Euler rotation vector, $\vec{\theta}$, can be defined to represent an arbitrary transformation where:

$$\vec{\theta} = \theta_x \vec{e}_1 + \theta_y \vec{e}_2 + \theta_z \vec{e}_3 \quad (3)$$

Given the Euler rotation vector, $\vec{U}$ can be obtained using equation (2) above.

The direction cosine transformation matrix can also be expressed in terms of the quaternion elements as follows:

$$\vec{U} = \begin{pmatrix} q_1^2 - q_2^2 - q_3^2 + q_4^2 & 2(q_1q_2 - q_3q_4) & 2(q_1q_3 + q_2q_4) \\ 2(q_1q_2 + q_3q_4) & -q_1^2 + q_2^2 - q_3^2 + q_4^2 & 2(q_2q_3 - q_1q_4) \\ 2(q_1q_3 - q_2q_4) & 2(q_2q_3 + q_1q_4) & -q_1^2 - q_2^2 + q_3^2 + q_4^2 \end{pmatrix} \quad (4)$$

The first three quaternion elements form the vector component of the quaternion. This vector component is aligned with the Euler rotation vector and the fourth quaternion component is a scalar. The quaternion elements are defined by equations (5) to (9) below:

$$\vec{Q}(\theta) = \begin{pmatrix} q_1 \\ q_2 \\ q_3 \\ q_4 \end{pmatrix} = \begin{pmatrix} \vec{q} \\ q_4 \end{pmatrix} \quad (5)$$

$$q_1 = e_1 \sin\left(\frac{\theta}{2}\right) \quad (6)$$

$$q_2 = e_2 \sin\left(\frac{\theta}{2}\right) \quad (7)$$

$$q_3 = e_3 \sin\left(\frac{\theta}{2}\right) \quad (8)$$

$$q_4 = \cos\left(\frac{\theta}{2}\right) \quad (9)$$

An attitude transformation can also be represented by a sequence of rotations about the axes of a coordinate system. A typical Euler rotation sequence is yaw, pitch, roll, where yaw is about the z-axis, pitch is about the y-axis, and roll is about the x-axis. The total transformation is the product of the individual transformation matrices and is given by:

$$\vec{U} = \vec{U}(\vec{\theta}_z) \vec{U}(\vec{\theta}_y) \vec{U}(\vec{\theta}_x) \quad (10)$$

The Euler rotation sequences, the Euler rotation vectors, and the quaternions can all be transformed into their corresponding DCMs.

The vehicle attitude can be propagated when the angular rates are known. The first order time dependent differential equations for quaternion parameters are given by:

$$\left(\frac{d\vec{Q}}{dt}\right) = \left(\frac{1}{2}\right)\begin{pmatrix} 0 & r & -q & p \\ -r & 0 & p & q \\ q & -p & 0 & r \\ -p & -q & -r & 0 \end{pmatrix}\vec{Q} \quad (11)$$

where p, q, r are roll, pitch, and yaw rates about the x, y, and z vehicle axes, respectively. The elements of the direction cosine matrix can be updated based on the set of differential equations given by:

$$\left(\frac{d\vec{U}}{dt}\right) = \vec{U}\begin{pmatrix} 0 & -r & q \\ r & 0 & -p \\ -q & p & 0 \end{pmatrix} \quad (12)$$

The quaternions can be integrated using equation (11) and used in equation (4) to obtain the direction cosine transformation matrix, which can be used to transform vectors between vehicle body and inertial frames. Alternatively, the elements of the direction cosine matrix can be integrated directly using equation (12).

Another method to propagate vehicle attitude is by combining a series of small rotations associated with a set of small time steps. It can be assumed that the angular rate vector remains fixed over the small time intervals. Each rotation results in an incremental rotation about the angular rate axis, which is considered an Euler rotation axis. The incremental rotation vector and transformation matrix are given by:

$$\Delta\vec{\theta} = \begin{pmatrix} \Delta\theta_x \\ \Delta\theta_y \\ \Delta\theta_z \end{pmatrix} = \begin{pmatrix} p\Delta t \\ q\Delta t \\ r\Delta t \end{pmatrix} \quad (13)$$

$$V = \begin{pmatrix} 0 & -\Delta\theta_z & \Delta\theta_y \\ \Delta\theta_z & 0 & -\Delta\theta_x \\ -\Delta\theta_y & \Delta\theta_x & 0 \end{pmatrix} \quad (14)$$

The updated transformation matrix is given by:

$$\vec{U}(t+\Delta t) = \vec{U}(t) + \vec{U}(t)\vec{V} \quad (15)$$

The associated quaternion is given by:

$$\vec{Q}(t+\Delta t) = \vec{Q}(t) + \left(\frac{1}{2}\right)\begin{pmatrix} 0 & \Delta\theta_z & -\Delta\theta_y & \Delta\theta_x \\ -\Delta\theta_z & 0 & \Delta\theta_x & \Delta\theta_y \\ \Delta\theta_y & -\Delta\theta_x & 0 & \Delta\theta_z \\ -\Delta\theta_x & -\Delta\theta_y & -\Delta\theta_z & 0 \end{pmatrix}\vec{Q}(t) \quad (16)$$

Figure 5:
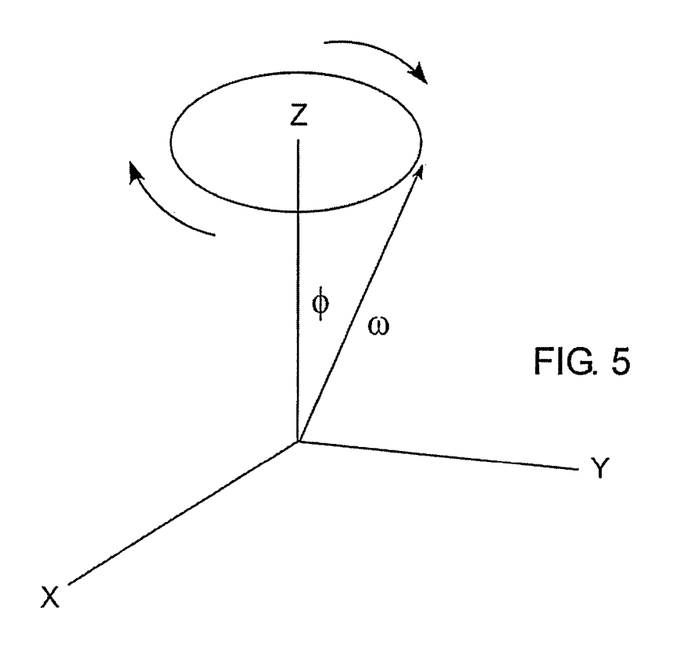
FIG. 5 is a diagram that helps illustrate the concept of coning motion.

This attitude propagation procedure has been enhanced to improve attitude propagation accuracy. With reference to FIG. 5, the first order differential equation for the Euler rotation vector, $\vec{\theta}$, involves the angular rate vector, $\vec{\omega}$, and is given by:

$$\dot{\vec{\theta}} = \vec{\omega} + \frac{1}{2}\vec{\theta}\times\vec{\omega} + \left(1 - \frac{\theta\sin(\theta)}{2(1-\cos(\theta))}\right)\vec{\theta}\times(\vec{\theta}\times\vec{\omega}) \quad (17)$$

Equation (13) is equivalent to equation (17) integrated over a short time interval without the last two terms on the right hand side in equation (17). The last two terms on the right hand side in equation (17) account for the change direction of the angular rate vector. In many implementations, the last term on the right hand side in equation (17) is omitted. The prior art comprises numerical methods to integrate equation (17). These methods are often referred to as "coning correction algorithms." Despite the improved accuracy that is obtained when using coning correction algorithms, there are still errors associated with coning correction algorithms.

SUMMARY

In one general aspect, the present invention is directed to computer-based systems and methods for determining attitude for a moveable object, such as a space vehicle, a terrain vehicle, or other type of moveable object where it is desirous to determine the attitude of the object. According to various embodiments, the attitude propagation methods of the present invention conceptually employ an additional coordinate system that slews with the angular rate vector of the object. In this intermediate slewing reference frame, the angular rate vector is fixed, thereby eliminating coning error. As shown below, embodiments of the present invention improve attitude propagation accuracy compared to prior art attitude propagation techniques. For example, for pure coning motion, there is no propagation error using attitude propagation methods according to embodiments of the present invention.

Embodiments of the present invention can be illustrated by considering an angular rate vector having a constant magnitude and slewing at a constant rate. The problem created by the angular rate vector changing direction or slewing is completely eliminated by transforming to the intermediate coordinate frame that is slewing with the angular rate vector. In the slewing reference frame, the resulting angular rate vector is fixed in direction. This permits integrating the fixed angular rate to determine the Euler rotation vector, thereby propagating the attitude. Because the attitude is required in the original non-slewing reference frame, a transformation is made back to the original reference frame. This may be accomplished, according to various embodiments, by integrating the negative of the slew rate to obtain the Euler rotation vector linking the original frame to the slewing frame. Thus, for a given propagation time, two sequential rotations generate the same attitude propagation as a constant angular rate vector slewing at a constant rate. There is no restriction on the magnitude of the angular rate, slew rate or propagation time. This means, in various embodiments, that attitude can be propagated extremely accurately for very long times using two simple rotations.

In realistic cases, the magnitude and slew rate of the angular rate change. However, over short enough time intervals, the magnitude of the angular rate vector is approximately fixed and its slew rate is also approximately fixed. According to various embodiments, the proposed attitude propagation methods can be applied to short intervals of time and the results can used to update the attitude over the required time span.

For example, in one embodiment, the attitude of the movable object is obtained by determining the transformation matrix $\vec{U}_N$ for the movable object from the body coordinate frame of the moveable object to the inertial reference frame for time $t_N$, where the transformation matrix $\vec{U}_N$ is indicative of the attitude of the movable object at time $t_N$. The transformation matrix $\vec{U}_N$ is determined in various embodiments by a computer-implemented process comprising: (i) determining the slew rate vector, $\vec{\alpha}$, for time $t_N$ for the moveable object, where the slew rate vector, $\vec{\alpha}$, represents a change in direction of the angular rate vector, $\vec{\omega}$, for the moveable object over the time interval from $t_{N-1}$ to $t_N$ in the body coordinate frame; (ii) determining the update to the transformation matrix $\Delta \vec{U}_N$ for time $t_N$ that is based on a product of two matrices, the first matrix being related to a sum of $\vec{\omega}$ and $\vec{\alpha}$, and the second matrix being related to $-\vec{\alpha}$; and (iii) multiplying the transformation matrix $\vec{U}_{N-1}$ for time $t_{N-1}$ and the update to the transformation matrix $\Delta \vec{U}_N$ for time $t_N$ to obtain the transformation matrix $\vec{U}_N$ for time $t_N$. Several ways of determining the slew rate vector, $\vec{\alpha}$, are disclosed herein.

FIGURES

Various embodiments of the present invention are described herein by way of example in conjunction with the following figures, wherein.

DESCRIPTION

In one general aspect, the present invention is directed to computer-based systems and methods for determining attitude propagation for a moveable object. As described further below, the new techniques for determining attitude propagation described herein employ an additional coordinate frame—in addition to the inertial and vehicle body frames used in prior art attitude propagation. The additional coordinate frame slews with the angular rate vector. In this intermediate slewing reference frame, the angular rate vector is fixed, thereby eliminating coning error. As described below, the attitude propagation techniques can improve attitude propagation accuracy. Moreover, for pure coning motion, there is no propagation error with attitude propagation techniques according to various embodiments of the present invention.

Before describing more details about the new attitude propagation techniques of the present invention, a description of applications in which the new attitude propagation techniques may be used is provided. The new attitude propagation techniques may be used to calculate or determine the attitude for any moveable object for which it is desirous to determine the attitude of the object. The moveable objects for which the new attitude propagation techniques may be used include vehicles, such as space vehicles (e.g., launch vehicles or satellites), aircraft, and terrain vehicles (e.g., cars, trucks, buses, etc.). The new attitude propagation techniques may also be used for other types of moveable objects, such as weapons, munitions, etc.

Figure 2:
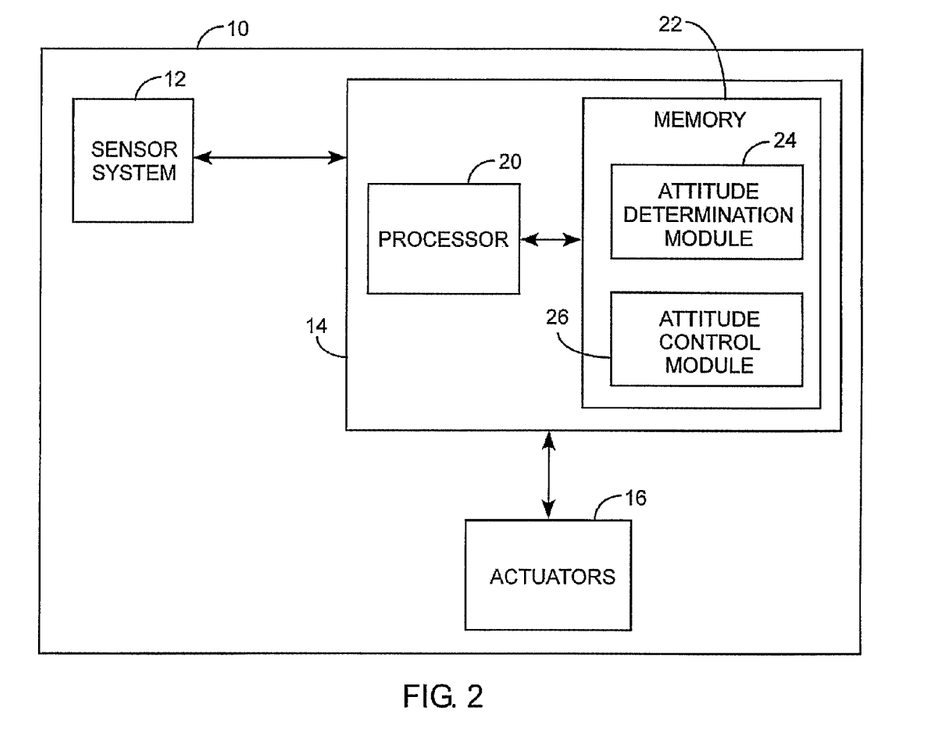
FIG. 2 is a block diagram of a moveable object, such as a vehicle, that determines the attitude of the object using attitude propagation techniques according to various embodiments of the present invention.

FIG. 2 is a block diagram of a moveable object that may employ the new attitude propagation techniques according to embodiments of the present invention. In the description, it is assumed that the moveable object is a space vehicle 10, although the invention is not so limited as described above. The vehicle 10 may comprise a sensor system 12, a flight computer system 14, and one or more actuators 16. The sensor system 12 may provide data to the flight computer system 14 indicative of the rates of rotation of the vehicle 10 about the roll, pitch, and yaw axes of the vehicle. The sensor system 12 may also provide additional data to the flight computer system, such as data indicative of acceleration of the vehicle along the axes of the vehicle.

The sensor system 12, in various embodiments, may comprise one or more inertial measurement units (IMUs). The IMUs may comprise one or more accelerometers and/or gyroscopes that sense the type, rate, and direction of motion by the vehicle. In particular, the IMUs may comprise one or more rate indicating gyroscopes (or "rate gyros") that sense the rate of rotation of the vehicle about the roll, pitch, and yaw axes of the vehicle. The rate gyros may be, for example, mechanical rate gyros or computer-based rate gyros (or "pseudo rate gyros") that emulate mechanical rate gyros based on data from sensors. More details about such pseudo rate gyros are provided in U.S. Pat. No. 6,263,264, which is incorporated herein by reference.

The flight computer system 14 may receive the data from the sensor system 12 and determine computationally the attitude of the vehicle based on the data. In various embodiments, the flight computer system 14 may also determine adjustments in the vehicle's attitude that should be made based on the determined attitude, such as by comparing the determined vehicle attitude to a desired vehicle attitude. If adjustments in the vehicle's attitude are required, the flight computer system 14, in various embodiments, may output commands to the actuators 16, which may correct the vehicle's attitude. The actuators 16 may comprise any suitable actuator, such as one or more thrusters, spin stabilization systems, electric motor-drive momentum wheels, solar sails, magnetic torquers, or any other suitable actuator given the nature of the vehicle/moveable object.

The flight computer 14 may comprise one or more networked, electronic computer devices. The computer device(s) may comprise one or more processors 20 and one or more computer memories 22. The processors 20 and the computer memories 22 may be formed using semiconductor integrated circuits. In one embodiment, the processor(s) 20 and the computer memory(ies) 22 may comprise separate integrated circuits, although in other embodiments they may be combined in a common integrated circuit. For convenience, only one processor 20 and only one memory 22 are shown in FIG. 2. The processor 20 may have one or multiple cores. The memory 22 may comprise a read only memory (ROM) and/or a random access memory (e.g., a DRAM).

As shown in FIG. 2, the memory 22 may comprise an attitude determination module 24 and an attitude control module 26. The attitude determination module 24 may comprise computer software instructions that when executed by the processor 20 cause the processor 20 to determine the attitude of the vehicle 10 using the attitude propagation techniques described herein. The attitude control module 26 may comprise computer software instructions that when executed by the processor 20 cause the processor 20 to determine attitude control commands for the actuators 16 based on the vehicle attitude determined by the attitude determination module 24. Although FIG. 2 shows the attitude determination module 24 and the attitude control module 26 being implemented by one computer system, this is for the sake of convenience, and the invention is not so limited. For example, in other embodiments, the flight computer system 14 may comprise one computer device for the attitude determination module 24 and another computer device for the attitude control module 26.

Data from the sensor system 12 may be stored in data storage of the flight computer system 14. The data storage may be a memory device (e.g., memory 22) of the flight computer system 14 and/or a more permanent data storage device of the flight computer system 14, such as a magnetic or optical disk. The sensor system 12 may communicate the data to the flight computer system 14 using wired and/or wireless communication links. For example, various sensors of the sensor system 12 may be connected to the flight computer system using parallel or serial communication links, such as RS-232, RS-423, RS-485, I²C, Ethernet, or any other suitable communication link.

Now, more details about the new attitude propagation techniques of various embodiments of the present invention are described. If an angular rate has a fixed direction, it can be integrated directly to determine the time dependent Euler rotation angle, which determines the transformation via equation (2) above. In this case, the angular rate remains aligned with the Euler axis and the Euler rotation vector:

$$\theta(t) = \int_0^t \omega(t')dt' \qquad (18)$$

This is equivalent to integrating equation (17) without the last two terms and obtaining the equivalent Euler rotation vector. Thus, only a simple integration of a one-dimensional integral is needed to obtain the attitude solution. If ω is constant, equation (17) can be integrated analytically to obtain the closed form solution for the Euler rotation vector, namely:

$$\vec{\theta}(t) = \vec{e}\theta(t) = \vec{\omega}t \qquad (19)$$

The associated DCM is obtained using equation (2) above, yielding:

$$DCM = \vec{U}(\vec{\theta}(t)) \qquad (20)$$

Various embodiments of the present invention use a closed form solution for an angular rate vector of constant magnitude that is slewing at a constant angular rate. The closed form solution may be obtained by a sequence of two simple rotations. According to various embodiments, the process begins by performing a transformation to the coordinate frame that is slewing with the angular rate vector. In the slewing frame, the angular rate is the original angular rate, ω, in the body coordinate frame plus the slew rate, $\vec{\alpha}$. The advantage of this transformation is that the angular rate in the slewing frame remains fixed. If the angular rate, ω, has constant magnitude and is slewing at the constant angular rate of α, the angular rate in the slewing frame is $\vec{\omega}+\vec{\alpha}$. Because this angular rate is fixed, the closed form solution can be obtained as described above. However, the attitude solution is now represented in the slewing frame rather than in the body frame. Therefore, the attitude solution is not complete until a transformation is made back to the original body frame which was not slewing. This is accomplished, in various embodiments, by a transformation using the negative of the slew rate vector, $-\vec{\alpha}$, applied for the same propagation time.

According to various embodiments, the first rotation may be obtained from:

$$\vec{\Psi}(t) = (\vec{\omega}+\vec{\alpha})t \qquad (21)$$

where $\vec{\omega}$ is the angular rate vector determined from the angular rate data from the sensor system 12 and $\vec{\alpha}$ is the slew rate vector. This transformation is essentially a rotation of magnitude |Ψ| about an Euler axis aligned with the fixed angular rate vector, $\vec{\omega}+\vec{\alpha}$. This transformation can be expressed as $\vec{U}(\vec{\Psi})$.

The second rotation is obtained similarly from:

$$\vec{\Omega}(t) = -\vec{\alpha}t \qquad (22)$$

Therefore, the second rotation has a transformation matrix given by $\vec{U}(\vec{\Omega})$. The combined transformation for the slewing reference frame, $\vec{U}_S$, is given by:

$$\vec{U}_S = \vec{U}(\vec{\Psi})\vec{U}(\vec{\Omega}) \qquad (23)$$

where $U_S$, Ψ, and Ω are time dependent through dependence on the selected propagation time, t. Thus, a vector in the vehicle frame at time t may be transformed back to the inertial frame by evaluating $\vec{\Psi}$ and $\vec{\Omega}$ from equations (21) and (22), and using them in equation (23), yielding:

$$\vec{X}_I = \vec{U}_S\vec{X}_B = \vec{U}(\vec{\Psi})\vec{U}(\vec{\Omega})\vec{X}_B \qquad (24)$$

Equation (23) is exact and is more computationally efficient than standard attitude propagation methods. Equation (23) holds for arbitrarily long time periods, as long as the magnitude of the angular rate is constant and the slew rate is constant.

Because angular rate vectors for typical vehicles are usually not constant in magnitude and do not usually slew at constant rates for extended periods of time, equations (21), (22), and (23) can only be applied for small increments of time practically. For short enough time increments, the angular rate magnitude may be assumed to be approximately constant and its associated slew rate also may be assumed to be approximately constant. Therefore, equations (21), (22), and (23) can be used to propagate vehicle attitude accurately. In addition, the need for "coning correction algorithms" is eliminated, because the propagation in equation (23) does not involve coning angular rate vectors.

Once the slew rate for each update time period is computed and used in equation (23), the total transformation up to the current time may be determined in various embodiments as:

$$\vec{U}_t = \Delta \vec{U}_1 \Delta \vec{U}_2 \Delta \vec{U}_3 \Delta \vec{U}_4 \ldots \Delta \vec{U}_N \quad (25)$$

where the time increments are numbered sequentially.

The slew rate of the angular rate vector may determined a number of different ways. A first technique involves a cross product. Assume that a time sequence of angular rate vectors is available. A moving window of two consecutive angular rate vectors may be processed to obtain a slew rate for the time duration between the two vectors. If the time step is small so that the angular rate vector can be assumed to not change very much, equation (23) can be used. The slew rate can be obtained, in one embodiment, by a vector cross product operation, which may be used to obtain the angle between the two angular rate vectors as follows:

$$\vec{S}_1 = \vec{\omega}_1 \times \vec{\omega}_2 \quad (26)$$

$$\Delta \gamma = \sin^{-1}\left(\frac{|\vec{S}_1|}{|\vec{\omega}_1||\vec{\omega}_2|}\right) \quad (27)$$

where $\vec{\omega}_1$ is the angular rate vector at time $t_1$ and $\vec{\omega}_2$ is the angular rate vector at time $t_2$, determined based on the angular rate data from the sensor system 12, and $\vec{S}_1$ is an auxiliary vector for the time window from time $t_1$ to time $t_2$.

The associated slew angular rate vector may be given by:

$$\vec{\alpha}_1 = \frac{\vec{S}_1 \Delta \gamma}{|\vec{S}_1|(dt)} \quad (28)$$

where $\vec{\alpha}_1$ is the slew angular rate vector for the time window from time $t_1$ to time $t_2$. It may be assumed in this method that the slew rate vector is normal to the plane containing the two angular rate vectors. The associated transformation matrix may be obtained based on equation (23) as:

$$\Delta \vec{U}_1 = \vec{U}((\vec{\omega}_1 + \vec{\alpha}_1)dt)\vec{U}((-\vec{\alpha}_1)dt) \quad (29a)$$

If the magnitude of $\vec{\omega}_1$ is different than that of $\vec{\omega}_2$, a gain in accuracy can be achieved by using the average magnitude of $\vec{\omega}$ in equation (29). In this case, $$\vec{\omega}_1 = \vec{\omega}_1 \frac{(\omega_1 + \omega_2)}{2\omega_1} \quad (29b)$$

The moving time window may be advanced one time step and the new set of two angular rate vectors may be processed in a similar fashion using equations (26) to (29b) to obtain the next incremental transformation matrix, $\Delta \vec{U}_2$. This process may be repeated until all the angular rate vectors in the sequence up to the current time are processed. The resultant transformation matrix, $\vec{U}_t$, may be found by multiplying the N incremental transformations in equation (25).

Another method for determining the slew rate of the angular rate vector, which provides higher fidelity, involves three consecutive angular rate vectors. The first two angular rate vectors may be used to define two vectors that define a coordinate transformation, $\vec{W}_1$, according to various embodiments, as follows:

$$\vec{v}_1 = \vec{\omega}_1 \times \vec{\omega}_2 \quad (30)$$

$$\vec{v}_2 = \vec{\omega}_1 \times \vec{v}_1 \quad (31)$$

where $\vec{v}_1$ and $\vec{v}_2$ are the incremental rotation transformation matrices. After unitizing $\vec{\omega}_1$, $\vec{v}_1$ and $\vec{v}_2$, the transformation $\vec{W}_1$ can be defined as:

$$\vec{W}_1 = (\vec{\omega}_1 \, \vec{v}_1 \, \vec{v}_2) \quad (32)$$

This process may be repeated with the second and third angular rate vector (i.e., $\vec{\omega}_2$ and $\vec{\omega}_3$) to obtain $\vec{W}_2$ as follows:

$$\vec{v}_3 = \vec{\omega}_2 \times \vec{\omega}_3 \quad (33)$$

$$\vec{v}_4 = \vec{\omega}_2 \times \vec{v}_3 \quad (34)$$

$$\vec{W}_2 = (\vec{\omega}_2 \, \vec{v}_3 \, \vec{v}_4) \quad (35)$$

The transformation between $\vec{W}_1$ and $\vec{W}_2$, in various embodiments, is $\vec{U}_1(\vec{\alpha}_1, \Delta t)$, and may be obtained using equation (36) below:

$$\vec{U}(\vec{\alpha}_1, \Delta t) = \vec{W}_2 \vec{W}_1^{-1} \quad (36)$$

The slew rate vector $\vec{\alpha}_1$ may be obtained from equation (36) using standard methods, and may be used in equation (29a) and equation (29b) to update the attitude over the associated time interval.

Once again, the moving time window may be advanced one time step and the next three angular rate vectors may be processed to obtain the next slew rate vector, $\vec{\alpha}_2$. This process may be repeated for subsequent time steps to obtain the total transformation give by equation (25).

Another method to obtain the slew rate of the angular rate vector involves a sequence of several angular rate vectors over an attitude update interval. According to such an embodiment, the components of the angular rate vector can be fit to a low order polynomial given by:

$$\vec{\omega} = \omega_x \vec{i} + \omega_y \vec{j} + \omega_z \vec{k} \quad (37)$$

$$\omega_i = a_i + b_i t + c_i t^2 + d_i t^3 \quad (38)$$

where i ranges over x, y, and z. The first and second time derivatives of the angular rate vector may be obtained from equation (38) as follows:

$$\dot{\omega}_i = b_i + 2c_i t + 3d_i t^2 \quad (39)$$

$$\ddot{\omega} = 2c_i + 6d_i t \quad (40)$$

The rate at which the angular rate vector is slewing may be given in equations (41) or (42) below:

$$\vec{\alpha} = \frac{\vec{\omega} \times \dot{\vec{\omega}}}{\vec{\omega} \cdot \vec{\omega}} \quad (41)$$

$$\vec{\alpha} = \frac{\vec{\omega} \times \ddot{\vec{\omega}}}{\dot{\vec{\omega}} \cdot \dot{\vec{\omega}}} \quad (42)$$

where the numerator of the right-hand side involves the vector cross product and the denominator involves the dot product. Equations (37)-(42) may be applied for each attitude update interval to obtain the associated slew rate and transformation given by:

$$\Delta \vec{U}_j = \vec{U}(\vec{\omega}_j + \vec{\alpha}_j)\vec{U}(-\vec{\alpha}_j) \quad (43)$$

where j is the sequential index for the update interval. The total transformation may be given by equation (25), which is the product of the sequential transformations given by equation (43).

In yet another embodiment, the slew rate vectors may be obtained using Euler's equations. Euler's equations can be expressed as:

$$\frac{d\vec{\omega}}{dt} = I^{-1}[(I\vec{\omega}) \times \vec{\omega}] + I^{-1}\vec{\tau} \quad (44)$$

where $\vec{I}$ is the inertia tensor expressed in the body frame and $\vec{\tau}$ is the applied torque to the body. Euler's equations provide $\vec{\omega}$ and $d\vec{\omega}/dt$, which can be used in equation (41). Alternatively, the derivative of Euler's equation can be used in equation (42).

The particular numerical implementations to obtain the slew rate vectors are presented for illustration purposes. Other implementations may be used in other embodiments of the invention.

Figure 3:
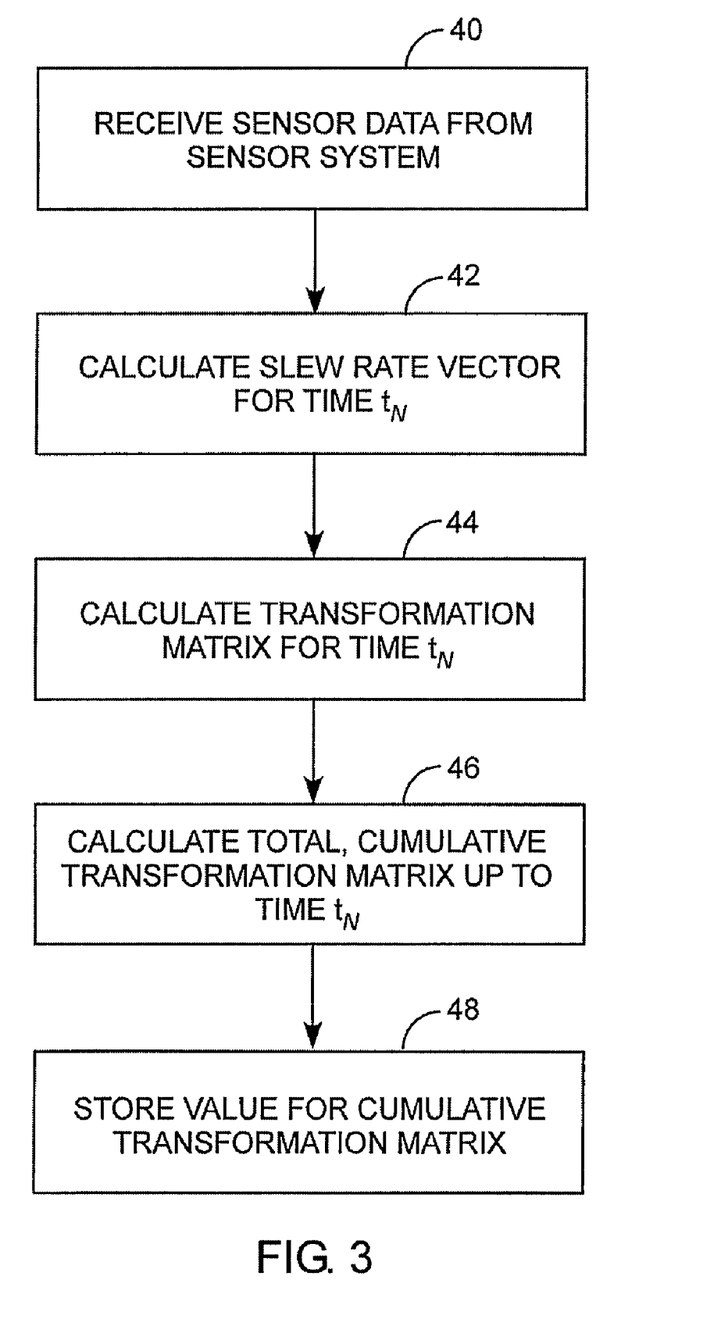
FIG. 3 is a flow chart illustrating a method to determine the attitude of an object according to various embodiments of the present invention.

FIG. 3 is a flow chart illustrating a process implemented by the computer system 14 when executing the attitude determination module 24 according to various embodiments. The process illustrated in FIG. 3 is for determining the total transformation matrix $\vec{U}$ from the body coordinate frame of the vehicle (or other moveable object) to the inertial reference frame for time $t_N$, which is indicative of the attitude of the vehicle at time $t_N$. Prior to time $t_N$, the flight computer system 14 received and stored the sensor data from the sensor system 12 for times $t_1$ to $t_{N-1}$. This data may be stored in a short-term and/or permanent data store of the computer system 14. The data may provide or represent the angular rate vectors $\vec{\omega}_1$, $\vec{\omega}_2$, $\vec{\omega}_3$, . . . , $\vec{\omega}_{N-1}$ for the corresponding time points $t_1$ to $t_{N-1}$. By time $t_N$, the flight computer system 14, in various embodiments, may have also previously propagated the vehicle attitude for times $t_1$ to $t_{N-1}$. The vehicle attitude propagation parameters, including the slew rate vectors $\vec{\alpha}_1$, $\vec{\alpha}_2$, $\vec{\alpha}_3$, . . . , $\vec{\alpha}_{N-2}$ for the N−2 consecutive time windows between time points $t_1$ to $t_{N-1}$, and the total transformation matrix $\vec{U}_{N-1} = \Delta\vec{U}_1 \Delta\vec{U}_2 \Delta\vec{U}_3 \Delta\vec{U}_4 \ldots \Delta\vec{U}_{N-1}$, may also be stored in a short-term and/or permanent data store of the flight computer system 14.

As shown in FIG. 3, at step 40, the flight computer system 14 receives from the sensor system 12 the sensor data readings for time point $t_N$, which may be stored in a data store of the computer system 14. At step 42, the computer system 14 may then calculate the corresponding slew rate vector $\vec{\alpha}_{N-1}$ for time window $t_{N-1}$ (i.e., the time window from $t_{N-1}$ to $t_N$). The updated slew rate vector may be calculated using any suitable numerical method, such as the cross product, coordinate transformation, curve fit, or Euler equation methods described above.

At step 44, the update to the transformation matrix for time $t_N$, $\Delta\vec{U}_N$, may then be calculated by the computer system 14. The computer system 14 may calculate the update transformation matrix, $\Delta\vec{U}_N$, for time $t_N$ using any suitable numerical computation, such as equations (29) or (43) above. Having thus calculated the update to the transformation matrix, $\Delta\vec{U}_N$, for the most recent time instant $t_N$, the total transformation up to time $t_N$ may then be calculated by the computer system 14 using equation (25) above, for example, at step 46. At step 48, the total, current transformation of the vehicle may be stored in a short term and/or permanent data store of the computer system 14. In various embodiments, the attitude control module 26 may read this data from the data store in order to control the attitude of the vehicle 10, such as by determining control commands for the actuators 16.

Figure 4:
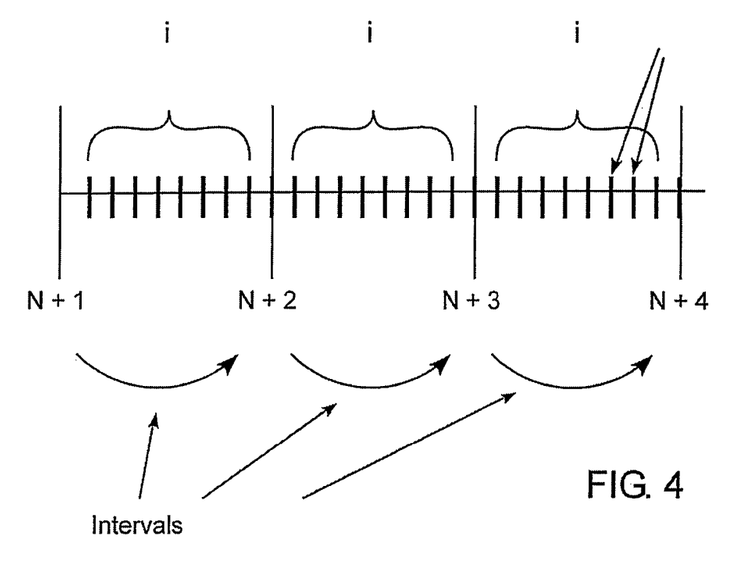
FIG. 4 is a diagram showing time intervals with subintervals.

The attitude propagation methods described herein can be used in strapdown inertial navigation units (INUs), which are used sometimes on flight vehicles to determine vehicle position velocity and attitude. The attitude is computed based on angular rates obtained from attitude rate sensors or gyros. Strapdown INUs, which are fixed to the vehicle body, use a sequence of angular rate vectors to propagate vehicle attitude. Because the attitude solution is required in real time or faster, efficient computation is required. The accuracy of current strapdown INUs is limited by coning motion or slewing of the angular rate vector. Coning motion results in an attitude drift rate that grows with time. Therefore, greater accuracy is required on longer duration missions that allow more time for attitude error growth. Coning correction algorithms are used on launch vehicle INUs to reduce attitude error. Typical attitude rate sensors used on flight vehicles produce attitude rates at frequencies higher than the required attitude update frequency. An INU may generate angular rates at 1,000 Hz, but a flight vehicle may only need angular rates at 100 Hz. FIG. 4 illustrates the processing time steps for interval and subinterval data. The higher frequency data can be processed in subintervals to generate a more accurate attitude at lower frequency intervals. Equation (17) can be integrated numerically over a subinterval to obtain the associated Euler rotation vector. The vector can then be used to update the vehicle attitude at each time interval. Several coning correction algorithms have been developed to numerically integrate equation (17) accurately and efficiently.

According to various embodiments, the attitude propagation methods described herein can be applied to data at each interval without using the subinterval data. In this case, the cross product or coordinate transformation method may be used to obtain the slew rate vector associated with each interval. Alternatively, the subinterval data can be curve fit to obtain the derivatives of the angular rate vectors. The derivatives can then be used with the angular rates to obtain the associated slew rates. Equations (25) and (29) can then be used to obtain the vehicle attitude. Such embodiments avoid the need for coning correction.

Simulations have shown that attitude propagation techniques according to embodiments of the present invention provide superior results than coning correction algorithm in examples involving pure coning motion. Assume that the vehicle has an Euler rotation vector given by:

$$\vec{\theta}(t) = \begin{pmatrix} \phi\sin(\omega t) \\ \phi\cos(\omega t) \\ 0 \end{pmatrix} \quad (45)$$

The corresponding angular velocity vector is given by:

$$\vec{\omega}(t) = \begin{pmatrix} \omega\sin(\phi)\cos(\omega t) \\ -\omega\sin(\phi)\sin(\omega t) \\ \omega(1-\cos(\phi)) \end{pmatrix} \quad (46)$$

The associated DCM is given by:

$$DCM = \begin{pmatrix} \cos(\phi)+(1-\cos(\phi))\sin^2(\omega t) & 0.5(1-\cos(\phi))\sin(2\omega t) & \sin(\phi)\cos(\omega t) \\ 0.5(1-\cos(\phi))\sin(2\omega t) & \cos(\phi)+(1-\cos(\phi))\cos^2(\omega t) & -\sin(\phi)\sin(\omega t) \\ -\sin(\phi)\cos(\omega t) & \sin(\phi)\sin(\omega t) & \cos(\phi) \end{pmatrix} \quad (47)$$

Executing this example using embodiments of the present invention described above, the vehicle's attitude was initialized by applying the Euler rotation vector given by equation (45) at t=0. The initial angular rate was provided by equation (46) with t=0 as:

$$\vec{\omega}(0) = \begin{pmatrix} \omega\sin(\phi) \\ 0 \\ \omega(1-\cos(\phi)) \end{pmatrix} \quad (48)$$

The angular rate given by equation (48) is constant in magnitude and cones about the z-axis with a rate given by:

$$\vec{\alpha} = \begin{pmatrix} 0 \\ 0 \\ -\omega \end{pmatrix} \quad (49)$$

Using equations (21) to (23), the attitude of the vehicle is given by:

$$\vec{U}_S(t) = \vec{U}((\vec{\omega}+\vec{\alpha})t)\vec{U}(-\vec{\alpha}t) \quad (50)$$

Thus, the attitude is propagated to any given time using two simple rotations given in equation (50). The resulting transformation matrix, $\vec{U}_S(t)$, is exactly that same as that given by equation (47) and is error free.

Figure 6:
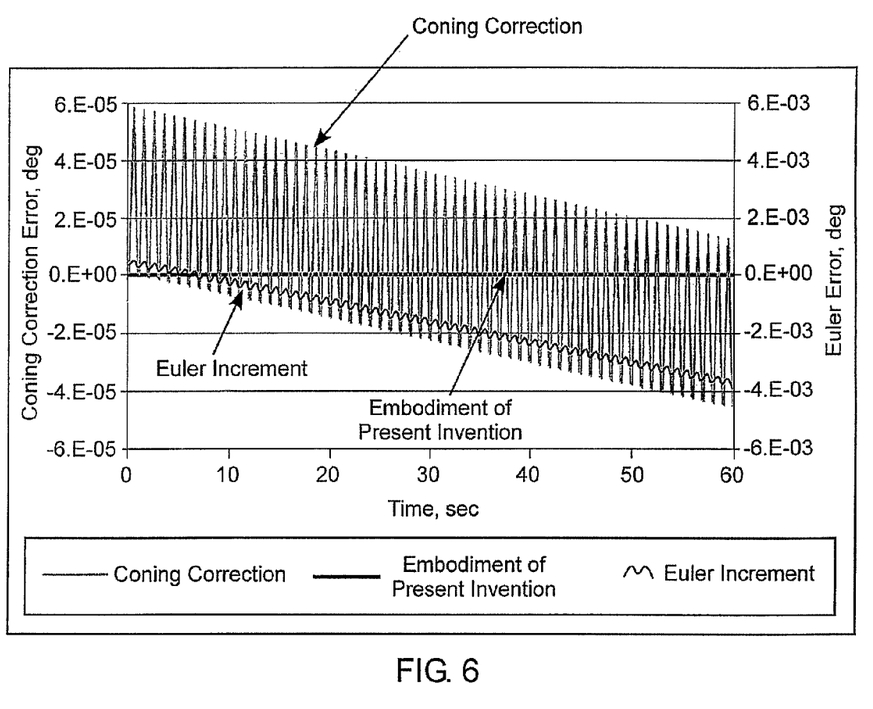
FIG. 6 is a graph illustrating the drift error rate in simulations involving different techniques for propagating attitude.

A computer simulation of the pure coning example was developed using the Euler increments updated every 1/128 of a second. In this example simulation, the angular rate vector had a coning frequency of one cycle per second with a 2-degree half cone angle. The data was divided into subintervals having a time step of 1/128 second. Nine subinterval steps were used in each interval. FIG. 6 illustrates the drift error about the z-axis associated with the prior art Euler increment method, which used data at each interval. This can be thought of as the case having no coning compensation. The drift rate about the z-axis is 0.2244 degs/hr, which is in agreement with published results for this example. [Coffee, J. R., F. Saggio, "Strapdown Gyro Contributions to Coning Motion Error," IEEE International Conference on System Engineering, pp. 55-58, Fairborn, Ohio, August 1989] FIG. 6 also contains results using the prior art coning correction algorithm represented in equation (17). Nine data samples in each subinterval were integrated using equation (17) to obtain θ, which was then used to update the attitude at each interval. Coning correction in this example reduced the z-axis drift rate to 0.002742 degs/hr, as illustrated in FIG. 6. Results using an embodiment of the present invention, which used only interval data, and not sub-interval data, are also illustrated in FIG. 6. The embodiment of the present invention used in this simulation has no propagation error, because the angular rate magnitude and slew rate or coning frequency is constant. The embodiment of the present invention can propagate the attitude to any time using only two rotations given by equation (50) once the slew rate is computed. Note that the slew rate in this case remains constant as does the angular rate magnitude.

The preceding methodology and numerical implementation was evaluated using simulated vehicle angular rates and attitude. A vehicle's attitude and angular rates were generated via computer simulation with a very small time step to ensure high accuracy. The data was down sampled to lower the sampling frequency and longer time step size. The angular rate data was used to propagate attitude using a set of simple Euler rotations about each angular rate vector. The accuracy of the attitude propagation was evaluated using the known attitude from the initial vehicle simulation that used smaller time steps. The attitude was also propagated for each time increment using equation (29). The slew rate for each incremental transformation was computed using equation (36) and the total transformation was found using equation (25). The attitude was also propagated using the curve fit method to determine the slew rate. Finally, the first two terms in equation (17) were integrated over each subinterval to correct for coning motion as is done using coning correction algorithms.

The test case has vehicle angular rates of 4.42, 1.0, 8.0 deg/sec for roll, pitch, and yaw respectively. Principal moments of inertia are 5.0, 4.0, 3.0 slug-ft² for roll, pitch, yaw axes respectively. A high fidelity propagator was used to propagate for ten (10) seconds using 10,000 time steps of equal duration. The data was down sampled by using every 10th data point. The down sampled data was processed by discrete Euler rotations and the preceding numerical implementation based on equation (25). The results are illustrated in FIG. 7.

Figure 7:
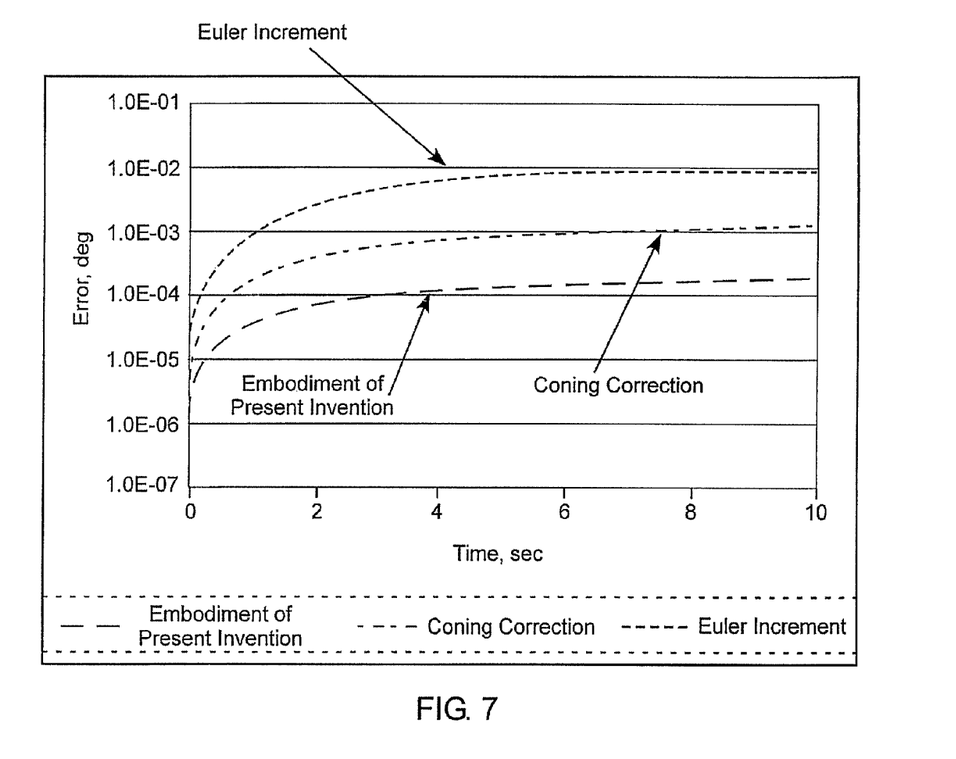
FIG. 7 is a graph illustrating error, in degrees, in simulations involving different techniques for propagating attitudes.

FIG. 7 illustrates the significant gain in accuracy of attitude obtained by the slewing algorithm method. In the example of FIG. 7, the coordinate transformation method was used to determine the slew rate at each interval and used for attitude update. Results from the curve fit method for determining the slew rate, not shown in FIG. 7, obtained roughly the same accuracy but used subinterval data to compute the slew rate.

The coning correction method also used subinterval data. The Euler increment method used only interval data. The slewing algorithm method of the present invention was found to be one hundred (100) times more accurate than the Euler increment method. In this example, the coordinate transformation method is ten (10) times more accurate than the coning correction method while using ⅒th the data. The curve fit method uses the subinterval data and obtains roughly the same accuracy as the coordinate transformation method.

Figure 8:
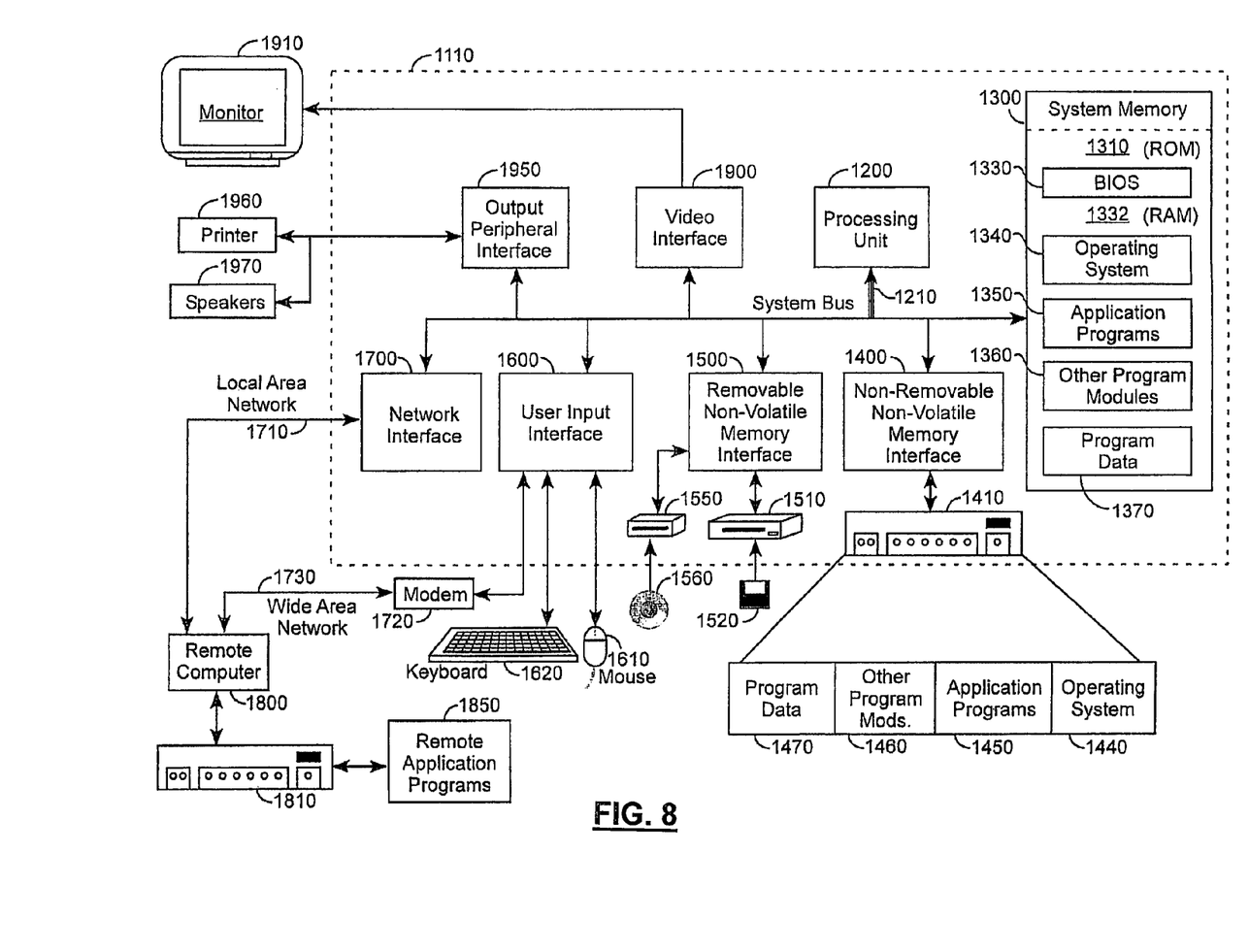
FIG. 8 is a diagram of a computer system according to various embodiments of the present invention.

FIG. 8 and the following discussion are intended to provide a brief general description of a suitable computing environment in which the described embodiments of the computer system 14 may be implemented. It should be understood, however, that handheld, portable, and other computing devices and computing objects of all kinds are contemplated for use in connection with the described embodiments. FIG. 8 illustrates one example of a suitable computing system environment 1000 in which the described embodiments may be implemented, such as for the computer system 14. Although as made clear above, the computing system environment 1000 is only one example of a suitable computing environment and is not intended to suggest any limitation as to the scope of use or functionality of the described embodiments. Neither should the computing environment 1000 be interpreted as having any dependency or requirement relating to any one or combination of components illustrated in the operating computing environment 1000. With reference to FIG. 8, one embodiment of a system for implementing the described embodiments comprises a general purpose computing device in the form of a computer system 1100. Components of the computer system 1100 may comprise a processing unit 1200, a system memory 1300, and a system bus 1210 that couples various system components including the system memory 1300 to the processing unit 1200. The system bus 1210 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer system 1100 generally comprises a variety of computer readable media. Computer readable media can be any available media that can be accessed by the computer system 1100 and includes both volatile and nonvolatile media, removable, and non-removable media. Computer storage media includes volatile and nonvolatile, removable, and non-removable media implemented in any method or technology for storage of information such as computer readable instructions, data structures, program modules, or other data. Computer storage media includes, but is not limited to, Random Access Memory (RAM), Dynamic RAM (DRAM), Double-Data-Rate DRAM (DDRAM), Synchronous DRAM (SDRAM), Static RAM (SRAM), Programmable ROM (PROM), Read Only Memory (ROM), Electrically Erasable Programmable Read Only Memory (EEPROM), flash memory, polymer memory such as ferroelectric polymer memory, ovonic memory, phase change or ferroelectric memory, silicon-oxide-nitride-oxide-silicon (SONOS) memory, Compact Disk Read Only Memory (CDROM), Compact Disc-rewritable (CDRW) Digital Versatile Disks (DVD) or other optical disk storage, magnetic cassettes, magnetic tape, magnetic disk storage or other magnetic storage devices, or any other medium which can be used to store the desired information and which can be accessed by the computer system 1100. It is worthy to note that some portion or the entire computer storage medium may be included in other elements of the apparatus computer system 1100. For instance, some or all of computer storage medium may be included on the same integrated circuit or chip with elements of the computer system 1100 (e.g., processing unit 1200). Alternatively, some portion or the entire computer storage medium may be disposed on an integrated circuit or other medium (e.g., a hard disk drive) that is external.

The system memory 1300 includes computer storage media in the form of volatile and/or nonvolatile memory such as ROM 1310 and RAM 1320. A basic input/output system 1330 (BIOS), containing the basic routines that help to transfer information between elements within the computer system 1100, such as during start-up, is typically stored in the ROM 1310. The RAM 1320 typically contains data and/or program modules that are immediately accessible to and/or presently being operated on by the processing unit 1200. By way of example, and not limitation, FIG. 8 illustrates an operating system 1340, one or more application programs 1350, other program modules 1360, and program data 1370.

The computer system 1100 also may comprise other removable/non-removable, volatile/nonvolatile computer storage media. By way of example only, FIG. 8 illustrates a hard disk drive 1410 that reads data from or writes data to non-removable, nonvolatile magnetic media, a magnetic disk drive 1510 that reads data from or writes data to a removable, nonvolatile magnetic disk 1520, and an optical disk drive 1550 that reads data from or writes data to a removable, nonvolatile optical disk 1560, such as a CD ROM, CDRW or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1410 is typically connected to the system bus 1210 through a non-removable memory interface such as interface 1400, and magnetic disk drive 1510 and optical disk drive 1550 are typically connected to the system bus 1210 by a removable memory interface, such as interface 1500.

The drives and their associated computer storage media discussed above and illustrated in FIG. 8 provide storage of computer readable instructions, data structures, program modules, and other data for the computer system 1100. In FIG. 8, for example, the hard disk drive 1410 is illustrated as storing an operating system 1440, one or more application programs 1450, other program modules 1460, and program data 1470. Note that these components can either be the same as or different from the operating system 1340, the one or more application programs 1350, the other program modules 1360, and the program data 1370. The operating system 1440, the one or more application programs 1450, the other program modules 1460, and the program data 1470 are given different numbers here to illustrate that, at a minimum, they are different copies. A user may enter commands and information into the computer system 1100 through input devices such as a keyboard 1620 and pointing device 1610, commonly referred to as a mouse, trackball, or touch pad, and a scanner 1490. Other input devices (not shown) may include a microphone, joystick, game pad, satellite dish, or the like. These and other input devices are often connected to the processing unit 1200 through a user input interface 1600 that is coupled to the system bus 1210, but may be connected by other interface and bus structures, such as a parallel port, game port or a universal serial bus (USB). A display device 1910 or other type of display device is also connected to the system bus 1210 via an interface, such as a video interface 1900, which may in turn communicates with video memory (not shown). In addition to the display device 1910, computer systems also may include other peripheral output devices such as speakers 1970 and a printer 1960, which may be connected through an output peripheral interface 1950.

The computer system 1100 may operate in a networked or distributed environment using logical connections to one or more remote computers, such as a remote computer 1800. The remote computer 1800 may be a personal computer, a server, a router, a network PC, a peer device or other common network node, and typically includes many or all of the elements described above relative to the computer system 1100, although only a memory storage device 1810 has been illustrated in FIG. 8. The logical connections depicted in FIG. 8 include a local area network (LAN) 1710 and a wide area network (WAN) 1730, but may also include other networks/buses. Such networking environments are commonplace in homes, offices, enterprise-wide computer networks, intranets, and the Internet.

When used in a LAN networking environment, the computer system 1100 is connected to the LAN 1710 through a network interface or adapter 1700. When used in a WAN networking environment, the computer system 1100 generally includes a modem 1720 or other means for establishing communications over the WAN 1730, such as the Internet. The modem 1720, which may be internal or external, may be connected to the system bus 1210 via the user input interface 1600, or other appropriate mechanism. In a networked environment, program modules depicted relative to the computer system 1100, or portions thereof, may be stored in the remote memory storage device. By way of example, and not limitation, FIG. 8 illustrates one or more remote application programs 1850 as residing on the memory device 1810. It will be appreciated that the network connections shown are non-limiting examples and other means of establishing a communications link between the computers may be used.

In one embodiment, the present invention is directed to a moveable object that comprises a computer system for determining attitude of the moveable object for time $t_N$. The computer system comprises at least one processor circuit and at least one memory circuit in communication with the at least one processor circuit. The memory circuit stores instructions that when executed by the at least one processor circuit, causes the processor circuit to determine the transformation matrix $\vec{U}_N$ by a process that comprises:

(i) determining a slew rate vector, $\vec{\alpha}$, for time $t_N$ for the moveable object, wherein the slew rate vector, $\vec{\alpha}$, represents a change in direction of an angular rate vector, $\vec{\omega}$, for the moveable object over the time interval from $t_{N-1}$ to $t_N$ in the body coordinate frame; (ii) determining an update to the transformation matrix for time $t_N$, $\Delta \vec{U}_N$, wherein the update to the transformation matrix $\Delta \vec{U}_N$ for time $t_N$ is based on a product of first and second matrices, wherein the first matrix is related to a sum of $\vec{\omega}$ and $\vec{\alpha}$, and the second matrix is related to $-\vec{\alpha}$; and (iii) multiplying the transformation matrix for time $t_{N-1}$, $\vec{U}_{N-1}$, and the update to the transformation matrix for time $t_N$, $\Delta \vec{U}_N$, to obtain the transformation matrix for time $t_N$, $\vec{U}_N$.

According to various implementations, the moveable object further comprises a sensor system in communication with the computer system for sensing and transmitting to the computer system data indicative of the angular rate vector, $\vec{\omega}$, for time $t_N$ for the moveable object. The sensor system may comprise at least one inertial measurement unit, at least one rate gyroscope, and/or at least one pseudo rate gyroscope.

The attitude of the moveable object for time $t_N$ may be determined by: (i) determining an update to the transformation matrix for the time period $t_{N-1}$ to $t_N$ based on the slew rate vector, $\vec{\alpha}$, and the at least one angular rate vector, $\vec{\omega}$, for time $t_N$; and (ii) multiplying (a) the update to the transformation matrix for the time period $t_{N-1}$ to $t_N$, and (b) the transformation matrix for the time period up to $t_{N-1}$.

The slew rate vector, $\vec{\alpha}$, for the moveable object for a time interval from $t_{N-1}$ to $t_N$ may be determined by: (i) determining a cross product of angular rate vectors, $\vec{\omega}$, for times $t_{N-1}$ and $t_N$; and (ii) determining the slew rate vector based on the cross product. In another embodiment, the slew rate vector may be determined by: (i) defining a first transformation based on the angular rate vector, $\vec{\omega}$, for times $t_{N-1}$ and $t_N$; (ii) defining a second transformation based on the angular rate vector, $\vec{\omega}$, for times $t_N$ and $t_{N+1}$; and (iii) determining the slew rate vector based on the first and second transformations. In yet another embodiment, the slew rate vector may be determined based on (i) a cross product of the angular rate vector $\vec{\omega}$, for time $t_N$ and a first time derivative of the angular rate vector $\vec{\omega}$, for time $t_N$, divided by (ii) a dot product of the angular rate vector $\vec{\omega}$, for time $t_N$ and itself. In yet another embodiment, the slew rate vector may be determined based on (i) a cross product of a first time derivative of the angular rate vector, $\vec{\omega}$, for time $t_N$ and a second time derivative of the angular rate vector $\vec{\omega}$, for time $t_N$, divided by (ii) a dot product of the first time derivative of the angular rate vector $\vec{\omega}$, for time $t_N$ and itself.

In other embodiments, the present invention is directed to a computer-implemented method for determining attitude of a moveable object for time $t_N$. According to various embodiments, the method may comprise the steps of: (i) determining a slew rate vector, $\vec{\alpha}$, for time $t_N$ for the moveable object, wherein the slew rate vector, $\vec{\alpha}$, represents a change in direction of an angular rate vector, $\vec{\omega}$, for the moveable object over the time interval from $t_{N-1}$ to $t_N$ in the body coordinate frame; (ii) determining an update to the transformation matrix for time $t_N$, $\Delta \vec{U}_N$, wherein the update to the transformation matrix $\Delta \vec{U}_N$ for time $t_N$ is based on a product of first and second matrices, wherein the first matrix is related to a sum of $\vec{\omega}$ and $\vec{\alpha}$, and the second matrix is related to $-\vec{\alpha}$; and (iii) multiplying the transformation matrix for time $t_{N-1}$, $\vec{U}_{N-1}$, and the update to the transformation matrix for time $t_N$, $\Delta \vec{U}_N$, to obtain the transformation matrix for time $t_N$, $\vec{U}_N$.

Reference throughout the specification to "various embodiments," "some embodiments," "one embodiment," "an embodiment," and the like means that a particular feature, structure, or characteristic described in connection with the embodiment is included in at least one embodiment. Thus, appearances of the phrases "in various embodiments," "in some embodiments," "in one embodiment," "in an embodiment," and the like in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments. The figures and descriptions of the embodiments have been simplified to illustrate elements that are relevant for a clear understanding of the embodiments, while eliminating, for purposes of clarity, other elements.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A moveable object comprising:
a computer system for determining an attitude of the movable object by determining a transformation matrix from a body coordinate frame of the moveable object to an inertial reference frame for time $t_N$, $\vec{U}_N$, where the transformation matrix $\vec{U}_N$ is indicative of the attitude of the movable object at time $t_N$, wherein the computer system comprises:
at least one processor circuit; and
at least one memory circuit in communication with the at least one processor circuit, wherein the at least one memory circuit stores instructions that when executed by the at least one processor circuit, causes the at least one processor circuit to determine the transformation matrix $\vec{U}_N$ by a process that comprises:
determining a slew rate vector, $\vec{\alpha}$, for time $t_N$ for the moveable object, wherein the slew rate vector, $\vec{\alpha}$, represents a change in direction of an angular rate vector, $\vec{\omega}$, for the moveable object over the time interval from $t_{N-1}$ to $t_N$ in the body coordinate frame;
determining an update to the transformation matrix for time $t_N$, $\Delta \vec{U}_N$, wherein the update to the transformation matrix $\Delta \vec{U}_N$ for time $t_N$ is based on a product of first and second matrices, wherein the first matrix is related to a sum of $\vec{\omega}$ and $\vec{\alpha}$, and the second matrix is related to $-\vec{\alpha}$; and
multiplying a transformation matrix for time $t_{N-1}$, $\vec{U}_{N-1}$, and the update to the transformation matrix for time $t_N$, $\Delta \vec{U}_N$, to obtain the transformation matrix for time $t_N$, $\vec{U}_N$.

2. The moveable object of claim 1, further comprising a sensor system in communication with the computer system for sensing and transmitting to the computer system data indicative of the angular rate vector, $\vec{\omega}$, for time $t_N$ for the moveable object.

3. The moveable object of claim 2, wherein the sensor system comprises at least one inertial measurement unit.

4. The moveable object of claim 2, wherein the sensor system comprises at least one rate gyroscope.

5. The moveable object of claim 4, wherein the at least one rate gyroscope comprises at least one pseudo rate gyroscope.

6. The moveable object of claim 1, wherein determining the slew rate vector, $\vec{\alpha}$, for the moveable object for the time $t_N$ comprises:

determining a cross product of angular rate vectors, $\vec{\omega}$, for times $t_{N-1}$ and $t_N$; and determining the slew rate vector $\vec{\alpha}$ based on the cross product.

7. The moveable object of claim 1, wherein determining the slew rate vector, $\vec{\alpha}$, for the moveable object for the time $t_N$ comprises:

defining a first transformation based on the angular rate vector, $\vec{\omega}$, for times $t_{N-1}$ and $t_N$;

defining a second transformation based on the angular rate vector, $\vec{\omega}$, for times $t_N$ and $t_{N+1}$; and determining the slew rate vector $\vec{\alpha}$ based the first and second transformations.

8. The moveable object of claim 1, wherein determining the slew rate vector, $\vec{\alpha}$, for the moveable object for the time $t_N$ comprises determining the slew rate vector, $\vec{\alpha}$, based on (i) a cross product of the angular rate vector $\vec{\omega}$, for time $t_N$ and a first time derivative of the angular rate vector $\vec{\omega}$, for time $t_N$, divided by (ii) a dot product of the angular rate vector $\vec{\omega}$, for time $t_N$ and itself.

9. The moveable object of claim 1, wherein determining the slew rate vector, $\vec{\alpha}$, for the moveable object for the time $t_N$ comprises determining the slew rate vector, $\vec{\alpha}$, based on (i) a cross product of a first time derivative of the angular rate vector $\vec{\omega}$, for time $t_N$ and a second time derivative of the angular rate vector $\vec{\omega}$, for time $t_N$, divided by (ii) a dot product of the first time derivative of the angular rate vector $\vec{\omega}$, for time $t_N$ and itself.

10. The moveable object of claim 1, wherein the moveable object comprises a vehicle.

11. The moveable object of claim 1, wherein the vehicle comprises a space vehicle.

12. A computer-implemented method for determining an attitude of a movable object by determining a transformation matrix from a body coordinate frame of the moveable object to an inertial reference frame for time $t_N$, $\vec{U}_N$, where the transformation matrix $\vec{U}_N$ is indicative of the attitude of the movable object at time $t_N$, the method comprising:

determining, with a computer system, a slew rate vector, $\vec{\alpha}$, for time $t_N$ for the moveable object, wherein the slew rate vector, $\vec{\alpha}$, represents a change in direction of an angular rate vector, $\vec{\omega}$, for the moveable object over the time interval from $t_{N-1}$ to $t_N$ in the body coordinate frame;

determining, with the computer system, an update to the transformation matrix for time $t_N$, $\Delta \vec{U}_N$, wherein the update to the transformation matrix for time $t_N$, $\Delta \vec{U}_N$, is based on a product of first and second matrices, wherein the first matrix is related to a sum of $\vec{\omega}$ and $\vec{\alpha}$, and the second matrix is related to $-\vec{\alpha}$; and multiplying, with the computer system, a transformation matrix for time $t_{N-1}$, $\vec{U}_{N-1}$, and the update to the transformation matrix for time $t_N$, $\Delta \vec{U}_N$, to obtain the transformation matrix for time $t_N$, $\vec{U}_N$, wherein the computer system comprises at least one computer device that comprises a processor circuit and a memory.

13. The method of claim 12, further comprising receiving, by the computer system, from a sensor system that is in communication with the computer system, data indicative of the angular rate vector, $\vec{\omega}$, for time $t_N$ for the moveable object.

14. The method of claim 13, wherein determining the slew rate vector, $\vec{\alpha}$, for the moveable object for the time $t_N$ comprises:
    determining a cross product of angular rate vectors, $\vec{\omega}$, for times $t_{N-1}$ and $t_N$; and determining the slew rate vector $\vec{\alpha}$ based on the cross product.

15. The method of claim 13, wherein determining the slew rate vector, $\vec{\alpha}$, for the moveable object for the time $t_N$ comprises:
    defining a first transformation based on the angular rate vector, $\vec{\omega}$, for times $t_{N-1}$ and $t_N$;
    defining a second transformation based on the angular rate vector, $\vec{\omega}$, for times $t_N$ and $t_{N+1}$; and
    determining the slew rate vector $\vec{\alpha}$ based the first and second transformations.

16. The method of claim 13, wherein determining the slew rate vector, $\vec{\alpha}$, for the moveable object for the time $t_N$ comprises determining the slew rate vector, $\vec{\alpha}$, based on (i) a cross product of the angular rate vector $\vec{\omega}$, for time $t_N$ and a first time derivative of the angular rate vector $\vec{\omega}$, for time $t_N$, divided by (ii) a dot product of the angular rate vector $\vec{\omega}$, for time $t_N$ and itself.

17. The method of claim 13, wherein determining the slew rate vector, $\vec{\alpha}$, for the moveable object for the time $t_N$ comprises determining the slew rate vector, $\vec{\alpha}$, based on (i) a cross product of a first time derivative of the angular rate vector $\vec{\omega}$, for time $t_N$ and a second time derivative of the angular rate vector $\vec{\omega}$, for time $t_N$, divided by (ii) a dot product of the first time derivative of the angular rate vector $\vec{\omega}$, for time $t_N$ and itself.

18. The method of claim 12, further comprising controlling at least one actuator of the moveable object based on the computed attitude of the moveable object to control the attitude of the moveable object.

19. A computer system for determining an attitude of a movable object by determining a transformation matrix from a body coordinate frame of the moveable object to an inertial reference frame for time $t_N$, $\vec{U}_N$, where the transformation matrix $\vec{U}_N$ is indicative of the attitude of the movable object at time $t_N$, the computer system comprising:
    at least one processor circuit; and
    at least one memory circuit in communication with the at least one processor circuit, wherein the at least one memory circuit stores instructions that when executed by the at least one processor circuit, causes the at least one processor circuit to determine the transformation matrix $\vec{U}_N$ by a process that comprises:
        determining a slew rate vector, $\vec{\alpha}$, for time $t_N$ for the moveable object, wherein the slew rate vector, $\vec{\alpha}$, represents a change in direction of an angular rate vector, $\vec{\omega}$, for the moveable object over the time interval from $t_{N-1}$ to $t_N$ in the body coordinate frame;
        determining an update to the transformation matrix for time $t_N$, $\Delta \vec{U}_N$ wherein the update to the transformation matrix $\Delta \vec{U}_N$ for time $t_N$ is based on a product of first and second matrices, wherein the first matrix is related to a sum of $\vec{\omega}$ and $\vec{\alpha}$, and the second matrix is related to $-\vec{\alpha}$; and
        multiplying a transformation matrix for time $t_{N-1}$, $\vec{U}_{N-1}$, and the update to the transformation matrix $\Delta \vec{U}_N$ for time $t_N$ to obtain the transformation matrix for time $t_N$, $\vec{U}_N$.

20. The computer system of claim 19, wherein the memory stores the transformation matrix $\vec{U}_{N-1}$ for time $t_{N-1}$.

* * * * *